Feb. 16, 1926.
G. H. REPKOW ET AL
AUTOMOBILE CARBURETOR ADJUSTER
Filed Oct. 9, 1924
1,573,123
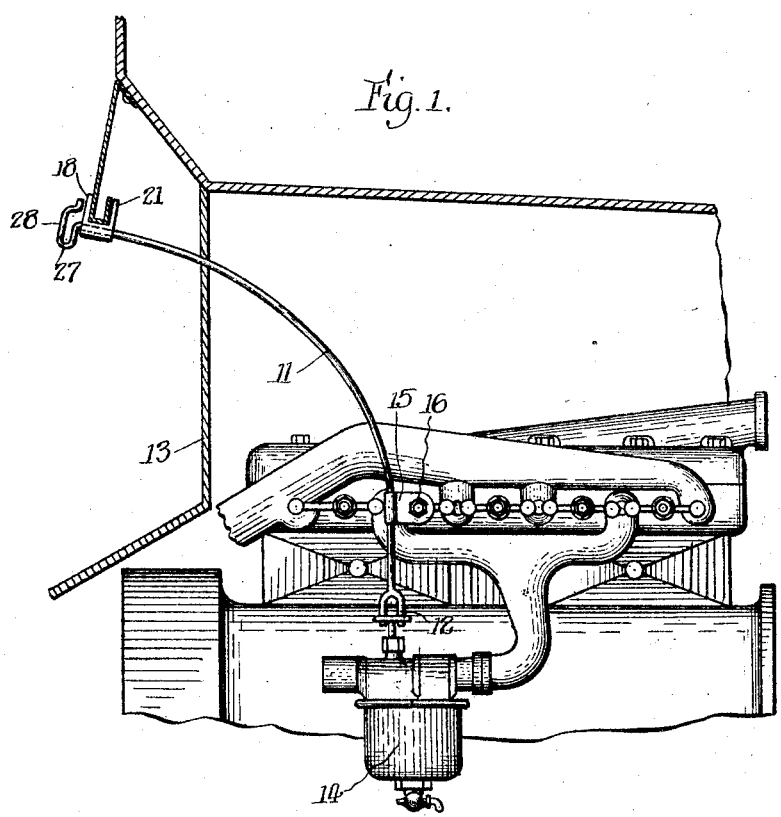
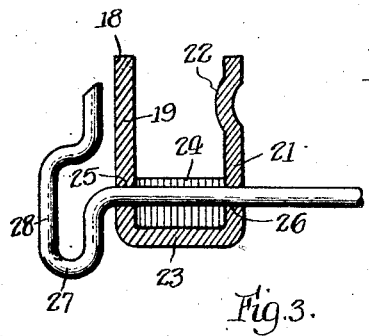
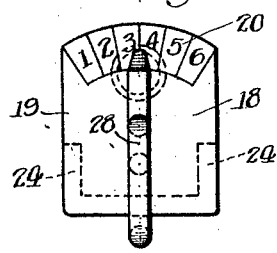
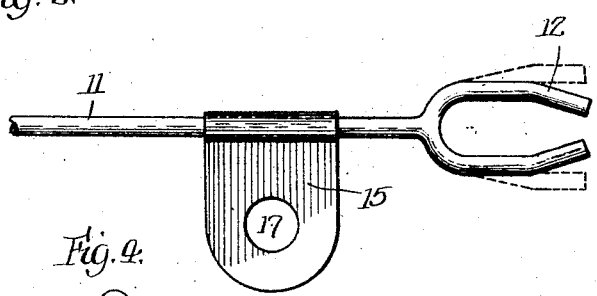

Patented Feb. 16, 1926.

1,573,123

UNITED STATES PATENT OFFICE.

GEORGE H. REPKOW AND JAMES T. BUNDO, OF WAUKEGAN, ILLINOIS.

AUTOMOBILE CARBURETOR ADJUSTER.

Application filed October 9, 1924. Serial No. 742,510.

*To all whom it may concern:*

Be it known that we, GEORGE H. REPKOW and JAMES T. BUNDO, both citizens of the United States, and both residing in the city of Waukegan, county of Lake, State of Illinois, have jointly invented certain new and useful Improvements in Automobile Carburetor Adjusters, of which the following is a specification.

Our invention pertains to structural and functional betterments in carburetor adjusting appliances adapted for use in automobiles, especially those of the Ford type, to permit regulation of the degree of opening of the carburetor needle-valve, whereby to vary the richness of the explosive gaseous mixture delivered by the carburetor to the motor.

One purpose of the invention is to supply a simple accessory of this character which may be readily and easily applied to the automobile by an unskilled person without requiring the drilling of any parts and without the employment of any additional screws or bolts.

A further aim of the invention is to provide a device of this type with a handle at the dash-board whereby the carburetor may be readily regulated or controlled with exactitude, the adjustment present at any time being indicated by the condition of the appliance.

An additional feature of the invention is the avoidance of the employment in the adjuster of any universal-joints or flexible, coiled-spring shafts, or similar constructions, which are not positive in their action, and hence do not assure the desired adjustment at all times, although under some circumstances universal-joints might be satisfactorily employed, but the expense of manufacturing those with adequate mechanical nicety and exactness of structure for the purpose desired would render them so expensive that they would not find a market for low-cost automobiles. Furthermore, universal-joints tend to rattle and become noisy.

An added characteristic of the improved adjuster embodying this invention resides in the fact that it incorporates a tempered steel spring rod or equivalent element which is flexed when applied to the automobile and which, due to its tendency to straighten, holds the parts associated with it against rattling, chattering and dislodgment even though the automobile vibrates substantially.

The device of the present application is simple in structure and hence can be manufactured economically and sold at a relatively low figure, such as would adapt it for use on inexpensive cars.

To enable those acquainted with and skilled in this art to have a full and complete understanding of the invention, both from structural and operating or performance standpoints, in the accompanying drawing, throughout the several views of which like characters have been employed to designate the same parts, we have illustrated a desirable and preferred embodiment of such invention.

In this drawing:—

Figure 1 is a somewhat diagrammatic illustration of the application of the novel carburetor adjuster to a Ford automobile;

Figure 2 is a face view of the adjuster as it is sold on the market and before it is applied to the automobile;

Figure 3 is an elevation of the lefthand end of the adjuster; and

Figure 4 is an edge view of the bracket which supports a part of the adjuster on the automobile engine or motor.

By reference to this drawing it will be seen that the improved carburetor-adjuster includes a tempered, steel, spring rod or shaft 11 normally straight, as shown in Figure 2, but capable of transverse or lateral bending or flexure when applied to the automobile, as illustrated in Figure 1.

At one end the rod or shaft 11 has a fork 12, the arms or prongs of which are initially or at first somewhat contracted, as shown in Figure 2, before the device is put to use on the automobile, to permit them to pass through the customary restricted aperture in the wall 13 of the automobile.

After installation on the car, the forked end 12 is spread or expanded, as indicated in dotted lines in Figure 2, and, in this condition, it is designed to directly engage or co-operate with the handle of the needle-valve of the carburetor 14, as depicted in Figure 1.

Such rod 11 is supplied with a sheet-metal, apertured bracket 15 surrounding it and lengthwise movable thereon, the bracket being designed to be held in position on the engine or motor by one of the bolts 16 extended through its aperture 17, such bolt being one of those normally employed for holding or securing the usual engine manifolds in place.

Rod or shaft 11 is also equipped with a U-shaped clamp or bracket, characterized as a whole 18, and comprising an outer-wall 19 supplied on its face with a series of gauge or adjustment numerals 20, an inner-wall 21 having an indentation or inward projection or boss 22, a bottom-wall 23 and opposite bracing end-walls 24, 24 extending only part way up the clamp, the two opposed walls 19 and 21 being apertured in register at 25 and 26, respectively, thus affording spaced bearings for the rod or shaft.

The corresponding terminal part of the rod is bent at 27 to provide a combined handle and pointer 28, the end of the rod constituting the pointer or index positioned adjacent to the series or row of gauge numerals 20.

The appliance is sold to the trade with the parts assembled as shown in Figure 2, and, when it is desired to place the device in operative position on the automobile, by means of a screw-driver or otherwise, the bracket 15 is spread and temporarily removed from or taken off of the rod and the contracted fork 12 is passed through the hole or aperture in the wall 13 of the automobile just back of the engine.

The forked end is then properly spread and applied to the handle of the valve of the carburetor, the bracket 15 is re-applied to the rod above the fork and contracted, and secured in place on the engine by the bolt 16 which was already thereon for assisting in holding the manifolds in position.

Clamp or bracket 18 receives the lower, marginal portion of the automobile dashboard 29 with the wall 19 facing the chauffeur or driver and the wall 21 at the back of the dash-board with its indentation 22 bearing against the under or forward face thereof.

The rod or shaft under these circumstances is considerably flexed or bent as shown, and its tendency to straighten out holds the clamp firmly and securely in position, lateral or sidewise movement of the rod and clamp being prevented by the engagement of the former with the marginal side walls of the hole through the wall 13.

Inasmuch as such bent or flexed spring has no substantial torsional give or play, practically the exact degree of turning of the handle 28 is transmitted to the carburetor valve and is indicated by one of the numerals 20, so that the operator by merely glancing at the position of the handle and its index is always certain of the exact adjustment of the carburetor, which would not be true if a coiled-spring, flexible shaft with material torsional looseness were employed or if a universal-joint were used in which there was any degree of play or slackness, as there always is in cheap structures.

Owing to the tension or strain on the rod 11 it holds the parts of the adjuster stably and steadily in position without possibility of its elements rattling or of their becoming loose or noisy.

Those skilled in this art will readily understand that the invention is not limited and restricted to the precise and exact details of structure presented, and that these may be modified within comparatively wide limits without departure from the heart and essence of the invention, as defined by the appended claims, and without the sacrifice of any of its material benefits and advantages.

We claim:

1. A carburetor adjuster adapted to be applied to an automobile, comprising in combination a single tempered spring steel rod having a fork at one end designed to be inserted through an aperture in a wall of the automobile to bring it into operative engagement with the carburetor valve, a supporting bracket for such rod designed to be mounted on the engine of the automobile, and an apertured clamp through which the rod extends and which is adapted to fit over the bottom margin of the dashboard of the automobile, the rod when thus installed in the automobile being transversely flexed and tending to straighten out and when turned rotating the carburetor valve.

2. A carburetor adjuster adapted to be mounted on an automobile, comprising in combination a spring rod having a contracted fork at one end designed to be expanded after mounting on the automobile for connection with its carburetor valve, a rod-supporting bracket on the rod designed to be mounted adjacent to the carburetor, and a clamp on the rod intended to straddle the lower edge of the automobile dashboard, the end of the rod adjacent to said clamp being bent to form an operating handle and the clamp adjacent to said handle being supplied with means to indicate the position of the handle, said bracket and clamp affording bearings for the flexed rod the turning of which by its handle is designed to adjust the carburetor valve.

3. A carburetor adjuster adapted to be mounted on an automobile, comprising a spring rod having at one end means for engaging the valve of the automobile carburetor, a supporting bracket for the rod and affording a bearing therefor, and a clamp on and having a bearing for the rod adapted to engage the lower margin of the automobile dashboard and be held pressed thereagainst by the tendency of the rod to straighten out after it has been applied to the automobile in flexed condition.

In witness whereof we have hereunto set our hands and seals.

GEORGE H. REPKOW. [L. S.]
JAMES T. BUNDO. [L. S.]